March 7, 1967     J. J. ARPIN     3,308,366

BATTERY TESTER

Filed April 24, 1964

INVENTOR
JULIEN J. ARPIN

BY
ATTORNEYS

United States Patent Office 3,308,366
Patented Mar. 7, 1967

3,308,366
BATTERY TESTER
Julien J. Arpin, 500 SE. 6th St.,
Fort Lauderdale, Fla. 33301
Filed Apr. 24, 1964, Ser. No. 362,335
9 Claims. (Cl. 320—43)

This invention relates generally to a protection device and more particularly to a device for automatically controlling an electrical connection from a battery to the accessories of a vehicle in response to the condition of the battery electrolyte.

Battery testers are old in the art per se, however, such prior known structures were not feasible in many respects. Battery testers are, of course, desirable for indicating a battery condition prior to complete exhaustion of the battery's power. Regardless of this necessity for battery testers, feasible and practical structures have not as yet been defined by the prior art.

For instance, all of the prior known battery testers which are incorporated into the structure of the battery are adversely affected by inertia and other external forces. These damaging forces on such prior structures are a result of thrust, torque, vibration, sudden starts, acceleration, or deceleration, all of which are incidental to the use of a vehicle. All of these different types of forces which are encountered during motion of a vehicle have damaging effects upon the battery testers which are presently known in the art. As a result, such prior structures can only be used successfully when the storage battery remains in a static position.

It is, therefore, an object of this invention to provide a battery tester which is unaffected by external forces.

It is another object of this invention to provide a battery tester which employs the conductivity of the battery electrolyte as the determining factor for controlling the electrical connection to the accessories of a vehicle.

Still another object of this invention is to provide a battery tester which indicates at a remote point the battery electrolyte condition.

Yet another object of the present invention is to provide a battery tester which controls the electrical system of a vehicle prior to complete exhaustion of the battery power.

Figure 1:
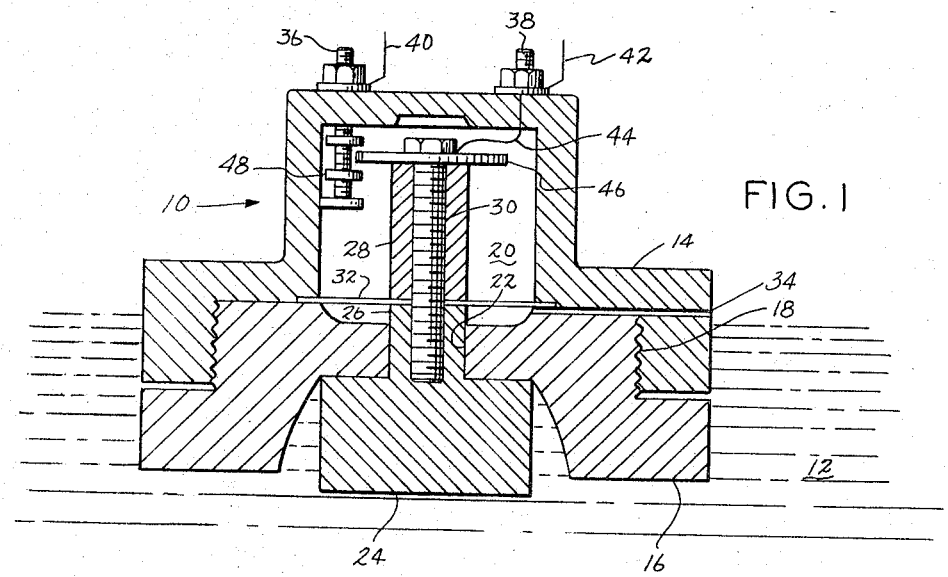
Figure 2:
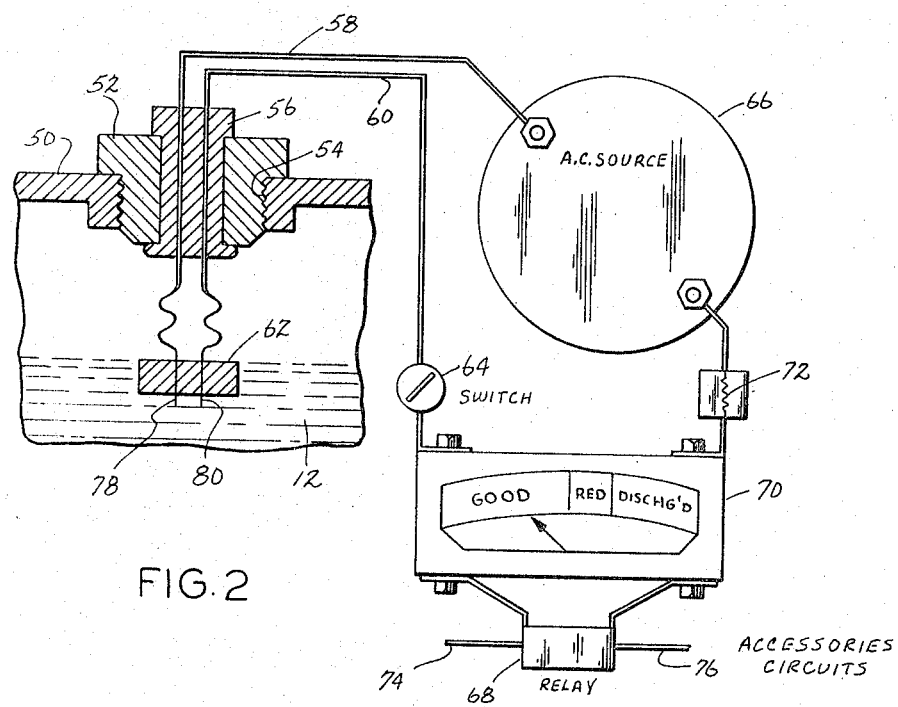

These and other objects of the present invention will be more fully realized and understood from the following detailed description when taken in conjunction with the accompanying drawing wherein:

FIGURE 1 is a sectional side elevational view of one embodiment of the present invention; and FIGURE 2 is another embodiment of the present invention partially in section and illustrating the electrical circuit employed in conjunction therewith.

As shown on the drawing:

Like reference numerals throughout the various views of the drawing are intended to designate the same or similar structures.

With particular reference to FIGURE 1, there is shown one embodiment of the present invention which includes a body member generally designated with the reference numeral 10 which is disposed for continuously floating in an electrolyte 12 of a battery. Body 10 is composed of an upper section 14 and lower section 16 which are threadably engaged with one another by means of threads 18. A cavity 20 is disposed within body 10 and terminates in an aperture 22.

A float 24 is disposed in the electrolyte and includes a shank 26 extending through aperture 22 into cavity 20. A spacer 28 is secured to the shank by means of a bolt 30. A flexible diaphragm 32 is secured between the upper and lower section of the body member at its outer periphery and between shank 26 and spacer 28 at its inner periphery. The flexible diaphragm may be bellows shaped if desired for allowing relative movement between the float and body member.

A vent hole 34 extends from the lower portion of cavity 20 defined by diaphragm 32 to an exterior wall of the body member. The vent hole allows escape of gases which may form within the cavity 20.

Binding posts 36 and 38 extend from the body member and wires 40 and 42 are secured to a respective one thereof. Binding post 36 extends inwardly of body member 10 into cavity 20. A wire 44 extends from binding post 38 and is engaged by bolt 30. A contracting member 46 is secured to spacer 28 by bolt 30 and is in electrical contact with wire 44. A contact 48 is threadably secured to binding post 36 and is disposed for being engaged by contacting member 46 upon relative downward movement of float 24 with respect to the body member.

This combination of structure shown in FIGURE 1 allows control of a circuit connected to wires 40 and 42 by virtue of the relative position of float 24 with respect to body member 10. Therefore, as the specific gravity of electrolyte 12 changes with a change in the potential of the battery, float 24 will be displaced with respect to body 10. The body member 10 floats on the electrolyte regardless of the charge condition of the battery, while the float 24 will either float or sink in the electrolyte depending upon the charge condition of the battery. Therefore, the body 10 and the float 24 may be constructed of different materials or otherwise constructed to perform such function. Displacement of float 24 in a downwardly direction as shown in the drawing allows contacting member 46 to make electrical connection with contact 48 and cause current flow between the wires 40 and 42. One circuit which may be controlled by the device of FIGURE 1 is illustrated in conjunction with the device of FIGURE 2.

As shown in FIGURE 2, a battery 50 includes the electrolyte 12 therein. A cap 52 is disposed in filler hole 54 of the battery. A grommet 56 extends through cap 52 and provides support for wires 58 and 60.

A float 62 is disposed in the electrolyte and provides support for the ends of wires 58 and 60 which extend into the electrolyte. Wires 58 and 60 between the float 62 and grommet 56 are shaped to allow relative movement of float 62 within the electrolyte. A switch 64 is disposed in wire 60 for operatively connecting the circuit therewith. A source of current 66 which is preferably alternating current is connected to wire 58. A relay 68 is connected between the switch and source of current and is energized when current conduction through electrolyte 12 is sufficient.

For providing a visual indication of the battery condition, a meter 70 is provided in the circuit. A resistor 72 is also provided in the circuit for adjusting the operating point of relay 68. The relay provides control of a connection between the wire 74 and the wire 76 which are in the circuit of the accessories.

The device illustrated in FIGURE 2 operates in response to the conductivity of electrolyte 12. Wires 58 and 60 terminate in electrodes 78 and 80, respectively, which extend from the underside of float 62 and into the electrolyte. Therefore, as the conductivity of electrolyte 12 between electrodes 78 and 80 changes, a change of current in the circuit will be detected. When this current reaches a predetermined value, relay 68 will be operated to open a connection in the accessories circuit. This value of conductivity is attained when the battery reaches a low value of charge or storage potential. Furthermore, if the electrolyte level diminishes sufficiently, a current path between the electrodes is removed and the meter will indicate such condition. Therefore, the device maintains a constant survey of the storage potential of the electrical storage battery and automatically warns of impending failure in the electrical system.

The embodiments of FIGURES 1 and 2 can be employed as portable devices for battery testing if so desired.

The principles of the invention explained in connection with the specific exemplifications thereof will suggest many other applications and modifications of the same. It is accordingly desired that, in construing the breadth of the appended claims they shall not be limited to the specific details shown and described in connection with the exemplifications thereof.

The invention claimed is:

1. A battery condition checking device comprising a body member disposed for floating on an electrolyte of a battery and having a cavity therein terminating in an aperture, a float disposed in said cavity and extending from the aperture into the electrolyte, said float disposed for floating on the electrolyte at a charge condition and sinking into the electrolyte at a substantially discharge condition of the battery, a diaphragm secured between said body member and said float within the cavity, said body member including a hole extending from between the diaphragm and the aperture to an exterior wall of said body member, a first contact secured within said cavity, a second contact secured at one end of said float and disposed for engaging said first contact, a relay connected to one of said contacts, and a source of current disposed between the other of said contacts and said relay.

2. A device for auotmatically controlling an electrical connection from a battery in response to the condition of the battery electrolyte comprising an electrically non-conductive float disposed in the electrolyte, a pair of electrodes spaced from one another and extending through and supported by said float in continuous contact with the electrolyte, a source of current connected to one of said electrodes, a relay providing the electrical connection being connected between the source of current and the other of said electrodes.

3. A device for automatically controlling an electrical connection from a battery to accessories of a vehicle in response to the condition of the battery electrolyte comprising an electrically non-conductive float, a pair of electrodes spaced from one another and extending through and supported by said float into the electrolyte in continuous contact therewith, a source of current and a relay disposed in series connection with one another between said electrodes, the relay disposed for controlling the electrical connection.

4. The device of claim 3 wherein said source of current is an alternating current source.

5. The device of claim 3 including a current indicating device disposed in the series connection.

6. A device for automatically controlling an electrical connection from a battery in response to the condition of the battery electrolyte comprising a filler cap, an electrically non-condutive float, a pair of electrodes extending through said filler cap and said float and supported by said float in continuous contact with the electrolyte, said electrodes being shaped between said cap and said float to allow displacement of said float with respect to said cap, a relay disposed for providing the electrical connection, a source of current disposed for actuating said relay, said source of current and relay being series connected between said electrodes.

7. The device of claim 6 including a current indicating device series connected with said relay.

8. A battery condition checking device comprising a body member disposed for floating on an electrolyte of a battery and having a cavity therein terminating in an aperture, and a float disposed in said cavity and extending from the aperture into the electrolyte, said float disposed for floating on the electrolyte at a charge condition and sinking into the electrolyte at a substantially discharge condition of the battery, said body member disposed for floating on the electrolyte at a charge and discharge condition of the battery, first contact means secured to said body member within said cavity, second contact means secured to said float and disposed for engaging said first contact means, and means for sensing engagement of said first contact means with said second contact means.

9. A battery condition checking device as defined in claim 8 including a diaphragm secured between said body member and said float within the cavity.

References Cited by the Examiner

UNITED STATES PATENTS

| 2,213,961 | 9/1940 | Hunter | 73—304 |
| 3,060,374 | 10/1962 | Strain | 324—29.5 |

FOREIGN PATENTS

| 18,338/34 | 7/1935 | Australia. |
| 60,614 | 3/1939 | Norway. |

JOHN F. COUCH, *Primary Examiner.*

S. WEINBERG, *Assistant Examiner.*